Patented June 5, 1951

2,555,370

UNITED STATES PATENT OFFICE 2,555,370

SULFURIZED DERIVATIVES OF ALKYL DIPHENYL OXIDE SULFONIC ACIDS AND SALTS THEREOF

Carl F. Prutton, Cleveland Heights, Ohio, assignor to The Lubrizol Corporation, Wickliffe, Ohio, a corporation of Ohio No Drawing. Application September 25, 1948,
Serial No. 51,307

5 Claims. (Cl. 260—512)

This invention relates to certain sulphides of sulphonic acids and the salts thereof as new compositions of matter.

More particularly, the invention comprises wax-substituted diphenyl oxide sulphonic acid sulphides in which the wax substituent or substituents may be derived from suitable waxes of petroleum origin such as, for example, paraffin wax, ceresin wax, slack wax, rod wax, slop wax, foots oil, etc. These compounds have been found to be of utility as lubricant additives, detergents, and intermediates useful in the preparation of other chemical compounds. Thus, wherever the term "wax substituted" is used in this specification and the claims, it is intended to refer to a wax-substituent which is derived from suitable paraffin waxes of petroleum origin.

PREPARATION OF THE WAX SUBSTITUTED DIPHENYL OXIDE

In the preparation of the compounds of this invention, it is convenient to prepare initially the wax-substituted diphenyl oxide. In order to effect the condensation of the aforementioned petroleum waxes or wax-like materials with the diphenyl oxide, the former must be in the form of a reactive derivative as for example, by being chlorinated and in that form used directly in the alkylation reaction; or an unsaturate may be prepared by first halogenating the wax followed by dehydrohalogenation. The preferred material for use in alkylating the diphenyl oxide is paraffin wax having a melting point of from about 30° C. to about 50° C. and which has been chlorinated to a chlorine content equivalent to the monochlor derivative. This can be accomplished in two ways: either by chlorinating the entire mass until the amount of combined chlorine is equivalent to the monochlor wax and then using that product, in which case any unchlorinated paraffin wax may be separated out after the alkylation reaction; or the pure monochlor wax may be separated from the chlorinated mass by a fractional crystallization procedure like that disclosed in Patent No. 2,218,132.

Throughout the following discussion, reference will be had to "wax-substituted diphenyl ether" (or oxide). It is recognized that wax, particularly paraffin wax, is a highly complex hydrocarbon. Furthermore, upon halogenation a complex mixture in which there are molecules of wax containing no chlorine, and others containing one, two, three, four and possibly more halogen atoms. Processes have been developed whereby monochlor wax, dichlor wax, etc., may be separated from such a crude mixture involving fractional crystallization means. (See Patent No. 2,218,132.)

The paraffin wax molecules contain more than 20 carbon atoms, generally about 24 to about 30 carbon atoms. Thus where I have employed chlorinated paraffin wax containing about 20% chlorine, it is seen that such molecules contain about 2 chlorine atoms per molecule. Accordingly, since the chlorine atom is the reactive point of the molecule in the alkylation reaction, the number of moles given in the examples is actually the number of gram equivalents of chlorine in a given weight of chlorwax and not the actual number of moles of chlorwax. This will be evident by calculations from the percentage of chlorine in the wax. Likewise, where such a chlorwax has been dehydrohalogenated, the same basis for calculating the number of moles has been used, such number referring to the number of gram equivalents of unsaturation present.

Therefore, strictly speaking, the "wax substituted diphenyl ether" to which I refer is in many instances a polydiphenyl ether substituted wax, i. e. a wax group having a plurality of diphenyl ether groups attached thereto. In a preferred case, I employ the equivalent of about 2.5 grams equivalent weights of chlorine per diphenyl ether group, although I have made products containing a lower proportion of wax as well as higher proportions.

To exemplify more specifically a procedure for the incorporation of a wax substituent on the diphenyl oxide nucleus, I have found that exceptionally fine yields of wax substituted diphenyl oxide may be obtained by admixing a wax halide with the diphenyl oxide in the presence of an acid activated clay catalyst, such as, Superfiltrol, Tonsil, Retrol, Attapulgus clay, and the like, and a small amount of zinc chloride. The proportion of the wax employed is, in any case, determined by the ratio of wax to diphenyl ether which it is desired to have present in the final product.

The alkylation step is generally performed by combining the reactive wax derivative and the diphenyl oxide and heating to a temperature somewhat in excess of 150° C. for a short period of time, and in the presence of the alkylation catalysts, namely, the acid activated clay type and the zinc chloride. Specific examples illustrating the particular alkylation process referred to herein are given below, and are for illustrative purposes only and are not to be construed as limiting my invention to these precise modes of preparation. It is clear that similar products may be made by using ordinary alkylation procedures such as the Friedel-Crafts reaction using aluminum chloride, heavy acid catalysts such as sulphuric, phosphoric, tetraphosphoric acid, and the like.

Where reference is made in the following examples to "wax unsaturate," it is intended to define a commercial wax unsaturate produced in accordance with the teachings disclosed in Patent No. 2,218,132 for the production of unsaturated wax materials.

Example 1

1925 grams of diphenyl oxide are mixed with 800 grams "Superfiltrol" an acid treated clay catalyst and heated to 210–220° C., 557 grams of wax unsaturate are added to the hot solution over a period of about 15 minutes, the temperature of the mixture being maintained during the addition period at 210–220° C. After the addition has been completed, the temperature is raised to 225–235° C. and there maintained for 2.5 hours. The product thus produced is filtered through hot cloth with the aid of "Hyflo" a diatomaceous earth filter aid. The yield of wax-substituted diphenyl oxide was 78.3%.

Example 2

1700 grams of diphenyl oxide, 800 grams of "Superfiltrol" and 160 grams of zinc chloride are mixed in a flask and heated to 170° C. The amount of zinc chloride is 3.5% by weight of the chlor wax to be added. 4500 grams of 18% chlor wax are added over a period of 90 minutes. The temperature of the mixture is maintained at 170° C. for one hour after which time it is increased to 240° C. and then filtered with the aid of "Hyflo." The filtrate is stripped to 225° C. at 2 mm. Hg absolute pressure. This product contained a trace of chlorine.

Example 3

425 grams (2.5 m.) of diphenyl oxide and 160 grams of "Superfiltrol," an acid treated clay catalyst, were combined in a reaction flask and heated to a temperature of 215° C. 1150 grams (5 m.) of wax unsaturate were added to the hot solution over a period of about 30 minutes, the temperature of the mixture being maintained during the addition period at about 220° C. to 230° C. After the addition had been completed, the temperature was maintained at 220° to 230° C. for an additional three hours. The product thus produced was filtered while hot. The filtrate was then stripped to 225° C. at 1 mm. Hg absolute pressure. The yield of di-wax-substituted diphenyl oxide, wherein there were present 2 wax groups per diphenyl oxide group, was 85%.

Example 4

340 grams (2 m.) of diphenyl oxide, 20 grams of zinc chloride and 100 grams of dry "Superfiltrol" were combined in a reaction flask. The mixture was heated up to 180° C. and 710 grams (4 m.) of chlor wax (containing 20% chlorine) were added dropwise over a 60-minute interval. After the addition had been completed the temperature was maintained at 180° C. for an additional 3 hours until hydrogen chloride evolution had ceased. The amount of hydrogen chloride given off neutralized 150 grams of sodium hydroxide. The reaction product was filtered hot under vacuum through a canvas pad coated with "Superfiltrol." The filtrate was then stripped under 5 mm. Hg absolute pressure until distillation temperature came to 140° C. to remove any unreacted diphenyl oxide. 103 grams of diphenyl oxide were so recovered. The product was then refiltered hot through a second pad coated with "Superfiltrol" to give a clear oily greenish fluorescent liquid which boiled at about 140° C. at 5 mm. Hg absolute pressure and had a melting point of about room temperature. The yield of wax-substituted diphenyl oxide was 79.5% and contained therein a very slight trace of chlorine.

Example 5

1020 grams (6 m.) of diphenyl oxide, 537 grams (3 m.) of chlor wax containing 19.8% chlorine) and 18 grams of aluminum chloride were combined in a reaction flask. The mixture was then stirred at room temperature for 3 hours. It was noted that after 15 to 20 minutes, hydrogen chloride gas was evolved rapidly. Eight additional grams of aluminum chloride were then added and the mixture heated to 50° C. for 2 additional hours. The reaction mixture was then poured into 100 cc. of 15% HCl solution and heated to 50° C. The product was extracted with benzene and washed with water, twice with 5% sodium bicarbonate, and twice with water. The solution was dried by refluxing with a water trap and the solvent, excess diphenyl oxide and wax were stripped to 270° C. at 1 mm. Hg absolute pressure. The yield of wax-substituted diphenyl oxide was found to be 75%. The product was an odorless red-brown viscous material which contained about 1.5% chlorine and had a boiling point greater than 270° C. at 1 mm. Hg.

Example 6

16,830 grams (99 m.) of diphenyl oxide was added to 3300 grams of "Superfitrol" in a reaction flask and heated to 210° C. and 14,850 grams (66 m.) of wax unsaturate were added as rapidly as possible through a dropping funnel while the temperature was maintained at 210° C. to 220° C. After the addition had been completed which required about 45 minutes, the reaction mixture was then heated for 2½ hours at 225° to 235° C. The reaction mixture was filtered while hot through paper and the aid of a vacuum. The filtrate was then returned to the reaction flask and stripped to 165° C. at 29 inches of vacuum. The residue is a product which showed a yield of monowax-substituted diphenyl oxide of about 85.5%. The product had a very faint odor and was a darkish green-brown liquid.

Example 7

535 grams (3 m.) of chlorinated paraffin wax (containing 20% chlorine) were combined in a reaction flask and heated to 60° C. at which temperature the solution of 20 grams AlCl$_3$ and 170 grams (1 m.) of diphenyl oxide and 75 cc. of ether were added slowly. The resulting reaction was slow after the addition and the temperature was then raised to 160° C. where a vigorous reaction occurred with the evolution of hydrogen chloride. After cooling, a liter of water and 250 cc. of concentrated hydrochloric acid added to the dark red mass and agitated and refluxed for 2 hours. The water layer was separated and the heavy emulsion distilled to 170° C. at 2 mm. The residue was heated with Filtercel and filtered through canvas. The yield of wax-substituted diphenyl oxide was about 93% and showed 3.41% chlorine present. The product had a mild pleasing odor and was a yellow-green fluorescent heavy oily material melting at approximately 25° C. and boiling above 170° C. at 12 mm. Hg. The product contained a mixture of diphenyl oxide groups having from 1-3 wax substituents per diphenyl oxide group.

*Example 8*

4080 grams (24 m.) of diphenyl oxide were combined in a reaction flask with 480 grams of "Superfiltrol" and heated to 160° C. 57 grams of zinc chloride were then added and then 2880 grams (16 m.) of monochlor wax added dropwise at 160° to 180° C. The material was then heated for 2 hours at 210° to 220° C. and filtered. The filtrate was stripped to 180° C. at 4 mm. vapor temperature. The yield of monowax-substituted diphenyl oxide was 64%. The product had a slight odor and was a bluish viscous liquid which contained .29% chlorine, had a bromine number of 4.16 and a molecular weight of between 474 and 526.

*Example 9*

425 grams (2.5 m.) of diphenyl oxide was combined with 200 grams of "Superfiltrol" in a reaction flask and heated to 220° C. 1150 grams (5.5 m.) of wax unsaturate were then added to the mixture through a dropping funnel for a period of 20 minutes. The mixture was then heated to 225° C.–235° C. and maintained there for one hour. The material was filtered while hot and the resulting filtrate was stripped to 225° C. at 1 mm. Hg. The yield of the di-wax-substituted diphenyl oxide was 84.5% and contained a slight trace of chlorine. The product was an odorless, pinkish brown viscous material which boiled at a temperature greater than 225° C. at 1 mm.

Where the number of wax substituents incorporated in the diphenyl oxide nucleus has been indicated in the preceding examples, this was determined by the amount of hydrogen chloride evolved during the alkylation reaction when the alkylating material was a monochlor wax. Thus, the numbers of substituents represents only an average number of substituents throughout the entire reaction mass.

Particular attention has been given to the alkylation procedure involving the conjoint use of two catalytic materials, e. g. an acid activated clay, and zinc chloride. This procedure has been found to be highly satisfactory in the alkylation of aromatic compounds generally because of, first, a high yield, and second, because of the elimination of the undesirable features associated with other commonly employed alkylation methods. It is of incidental interest to note that when diphenyl oxide and chlorinated wax are heated together in the presence of zinc chloride, no wax-substituted diphenyl oxide is formed. When diphenyl oxide and chlor wax are heated together and Superfiltrol is added as the only catalyst, there is obtained an alkylated diphenyl oxide, but the yields are relatively low. When chlorinated wax is heated together with diphenyl oxide, and Superfiltrol and zinc chloride catalysts are added sequentially in either order, some product is also produced with slightly higher yields than when Superfiltrol is used alone. The best results from the standpoint of high yield are produced when the Superfiltrol and zinc chloride are both present at the beginning of the reaction period. The combined use of these two catalytic materials is productive of a higher yield than is capable of being obtained when either is used alone. The immediate product produced by the alkylation step when using as catalysts the combination of an acid treated clay such as Superfiltrol and zinc chloride and when using chlorinated wax as the alkylating material will be found to be superior from the standpoint of purity and freedom from products resulting from undesirable side reactions than when such immediate product is produced by the use of aluminum chloride as the catalyst.

PREPARATION OF THE SULPHONIC ACID DERIVATIVES

The wax substituted diphenyl oxide products produced according to the methods specifically given above or any other convenient methods of accomplishing the same results are, in the preferred case, then converted to the sulphonic acid derivatives. There are, of course, a large number of ways in which this step may be accomplished. The most convenient of these involved the treatment of the wax substituted diphenyl oxide intermediate with a slight molecular excess of chlorsulphonic acid at a temperature in the range of from about 25° C. to about 75° C. The following examples are illustrative of the preparation of the sulphonic acid derivative by treatment with chlorsulphonic acid which is the most convenient sulphonating reagent when dealing with an aromatic compound. It will be noted that the following examples have been carried one step further, however, and converted to the salt of the sulphonic acid. However, the method of preparation of the sulphonic acid is clearly illustrated herein.

*Example 10*

554 grams (1 m.) of wax-substituted diphenyl oxide produced in accordance with Example 3 above were combined with 121 grams (1.05 m.) of chlorsulphonic acid in a reaction flask at a temperature of about 30 to 50° C. This reaction mixture was then stirred for 2 hours at 70 to 80° C. The acid number of the resulting reaction product was 80. 800 grams of SAE 10 oil, 100 cc. of methanol and a 20% excess of calcium hydroxide (40 grams) were added to the above reaction product and stirred at 70 to 90° C. for 2 hours and then dried at 150 to 160° C. for 30 minutes. 1000 cc. of benzene were added and the solution filtered through hot cloth with "Hyflo" until clear. The filtrate was vacuum distilled at 150 to 160° C. and 28 inches vacuum to remove the benzene. The yield of the calcium salt of wax-substituted diphenyl oxide sulphonic acid was 98%. This product possessed a fair odor and was a brown solid. A 45% SAE 10 oil solution analyzed as containing 2.07% sulphur, 4.45% sulphate ash and had an acid number of 2.6. Up to a 50% concentration of the product was found completely soluble in Pennsylvania 150 neutral oil. The product contained a mixture of diphenyl oxide groups having from 1 to 3 wax substituents per diphenyl oxide group.

*Example 11*

550 grams of wax-substituted diphenyl oxide produced in accordance with the above Example 3 were combined with 110.5 grams of chlorosulphonic acid in a reaction flask at 30–50° C. in a mole ratio of 1 to 1.05. The mixture was stirred for 2 hours at 60–70° C. The acid number of the reaction product thus formed was 87.7. 640 grams of SAE 10 oil, 100 cc. of methanol and a 20% excess of calcium hydroxide (44 grams) were then added to the reaction product and stirred for 2 hours at 70 to 90° C. The resultant product was then dried at 150° C. for 30 minutes at which time, 1000 cc.'s of benzene were added to loosen the thick sulphonate. The filtrate was then distilled at 150° C. and 28 inches of vacuum to remove the benzene. The solution was then filtered with "Hyflo" until clear. The yield of the calcium salt of wax-substituted diphenyl oxide sulphonic acid was 94%. The product had a fair odor and was a brown solid. A 50% SAE 10 oil solution analyzed as containing 2.14% sulphur, 4.99% sulphate ash and had an acid number of about 4.2. The product was found to be soluble up to 10% in Pennsylvania 150 neutral oil but 50% was partially insoluble.

*Example 12*

76 grams (0.65 m.) of chlorosulphonic acid were combined with 217 grams (0.62 m.) of wax-substituted diphenyl oxide in a reaction flask at 35–40° C. It was necessary to add 1 gram of $CHCl_3$ to the mixture to permit stirring. The acid number of the product at this point was 100. The product was neutralized with 25 grams of sodium hydroxide in 136 cc. of water, and stirred for 30 minutes at 80° C. under 100 mm. vacuum to remove the $CHCl_3$. The yield of the sodium salt of wax-alkylated diphenyl oxide sulphonic acid was 100%, the product was brown in color and had a sulphate ash of 11.2%.

*Example 13*

160.5 grams (1.375 m.) of chlorsulphonic acid were combined with 554 grams (1 m.) substituted diphenyl oxide in a reaction flask at 30–50° C. and then stirred for 2 hours at 60° C. The acid number of the reaction product was 118. 800 grams of SAE 10 oil, 100 cc. of methanol and 20% excess calcium hydroxide (62 grams) were then added and the mixture stirred for 2 hours at 70–90° C. and then dried at 150° C. for 30 minutes. 1200 cc.'s of benzene were added and the product filtered with the aid of "Hyflo." Benzene was removed from the filtrate at 150° C. and 55 mm. pressure. The yield of the calcium of wax-substituted diphenyl oxide sulphonic acid was 91%. The product had a fair odor and was a brown solid which crumbled rather easily. An analysis of the resulting product showed 2.3% sulphur, 5.9% sulphate ash and had an acid number of 3.62. The product was soluble up to 50% in Pennsylvania 150 neutral oil.

*Example 14*

386 grams (.728 m.) of wax-substituted diphenyl oxide and 132.2 grams (1.135 m.) of chlorsulphonic acid, a mole ratio of 1 to 1.55 were combined in a reaction flask at 30–50° C. and then stirred for 2 hours at 70–80° C. The acid number of the reaction product was 134. 567 grams of SAE 10 oil, 100 cc. of methanol and 20% excess of calcium hydroxide (49 grams) were then added to the reaction product and stirred for 2 hours at 70–90° C. 56.5 grams of capryl alcohol were then added and the mixture dried at 150–160° C. for 30 minutes. 1000 cc. of benzene were added and the solution filtered with 40 grams of "Hyflo." The benzene was then distilled off at 150° to 160° C. and 28 inches vacuum. The yield of the calcium salt of wax-substituted diphenyl oxide sulphonic acid was 98%. The product had a rather fair odor and was a brown solid. 1% of the product was soluble in Pennsylvania 150 neutral oil with 50% of the product forming a jell when added to the same oil. The analysis of the resulting product showed 2.5% sulphur, 7.03 sulphate ash and a basic number of 2.1.

In general, therefore, it will be seen that after the wax-substituted diphenyl oxide has been produced, it may then be treated with a slight molar excess of a strong sulphonating reagent such as chlorsulphonic acid or the like. Generally, such sulphonation is accomplished by adding the suphonating reagent dropwise to the wax-substituted diphenyl oxide while vigorously stirring and cooling the mixture. At the completion of the sulphonation, water may be added to the mixture and the viscous layer which separates out consists predominantly of the wax-substituted diphenyl oxide sulphonic acid. As indicated, the water separation step is not necessary if the material thus produced is only an intermediate product and is to be further reacted upon to produce a final product, such as a salt, in accordance with this invention.

Generally the sulphonic acid group will be present in a ratio of about one sulphonic acid group per diphenyl oxide group. However, products have been produced which contain an average of from about 1.37 to about 1.55 sulphonic acid groups per diphenyl oxide group. Low molecular weight alcohols are employed to facilitate production of the polyvalent metal salts, while the higher molecular weight alcohols such as octyl or capryl alcohols are used as solubilizers in oil solution.

PREPARATION OF THE SULPHIDE DERIVATIVES

The sulphur containing derivatives of the foregoing wax-substituted diphenyl oxide sulphonic acid intermediates, or the salts thereof, may be secured by reacting such intermediate with a sulphurizing agent such as $SCl_2$ or $S_2Cl_2$ for a period of time at a relatively low temperature. When this process is carried out there results a molecular structure in which at least two wax-substituted diphenyl oxide groups are interconnected by a sulphur bridge. When such a bridge structure has been obtained and the bridging group consists of one or two sulphur atoms, that product may be further treated with a sulphur imparting reagent, such as elemental sulphur, to increase the number of bridging sulphur atoms from one or two up to at least five or six depending upon the molar ratio of sulphur which is employed. It is believed also that under such conditions, there may be formed simultaneously various amounts of bridged compounds in which a plurality of wax substituted diphenyl oxide sulphonic acid sulphide or disulphide molecules become linked by one or more sulphur atoms. I have denominated these materials as polymers, and the use of such term with respect to these materials denotes the structure explained above.

The following examples are illustrative of the method of preparing preferred examples of the final products contemplated hereby:

*Example 15*

121 grams (1.05 m.) of chlorsulphonic acid were combined in a reaction flask with 530 grams (1 m.) of wax-substituted diphenyl oxide prepared in accordance with Example 10 above and 100 cc. of Lactol spirits at 30–50° C. 67.5 grams (.5 m.) of $S_2Cl_2$ were then added at 50–60° C. and the mixture stirred for an additional 2 hours at 60–70° C. The acid number of the reaction product was 8.25. 800 grams of SAE 10 oil, 100 cc. of methanol and 45 grams of calcium hydroxide (20% excess) were then added to the reaction product and stirred for 2 more hours at 70–90° C. The resulting product was dried at 150–160° C. for 30 minutes. 1000 cc. of benzene were then added and the material filtered with "Hyflo," until clear. The solvent was removed at 150–160° C. and 28 inches of vacuum. The yield of the calcium salt of di-wax-substituted diphenyl oxide sulphonic acid di-sulphide was 95%. The product had a burnt odor and was a dark brown grease like solid which contained 3.94% sulphur, 0.23% chlorine, 5% sulphate ash and had an acid number of 6.5. The product was soluble up to 50% in Pennsylvania 150 neutral oil.

*Example 16*

856 grams of wax-substituted diphenyl oxide prepared in accordance with Example 2 above are dissolved in 400 cc. of A. S. T. M. naphtha. To this mixture are added 198 grams of chloro sulphonic acid at about room temperature. During such addition, the temperature rises to about 50° C. The mixture is then stirred for one hour at 60° C. At the end of this period, 109.2 grams $S_2Cl_2$ are added at a temperature of 50–60° C., and the mixture then stirred for two hours at 60–70° C. At this point the acid number of the reaction product was found to be 75.0. 1295 grams of an SAE 10 oil, 100 cc. of methyl alcohol and a 20% excess of calcium hydroxide (82 grams) are added and the mixture stirred for two hours at 70–90° C. Thereafter the mixture was dried at 90–100° C. and became solid. Then two liters of benzene were added and the mixture further dried under reflux. 150 grams of a diatomaceous earth filter aid were added and the product filtered until clear. The filtrate was vacuum distilled at 150–160° C. and 50 mm. Hg pressure to remove the benzene. The residue is the product. This product was a blackish brown material having a solid consistency and a foul odor. Upon analysis this product was found to contain 4.08 sulphur, had an acid number of 6.06, and a calcium sulphate ash of 5.34%. The product was soluble in Pennsylvania 150 neutral oil in concentrations of 50%, 10% and 1%. No tendency to settle out upon standing was observed.

*Example 17*

122 grams of chlorosulphonic acid were added in dropwise fashion to 530 grams of wax-substituted diphenyl oxide as described above in Example 3. 68 grams of $S_2Cl_2$ were added at 55–65° C. and the mixture stirred one hour. The product at this point had an acid number of 94.5. 43.3 grams of sodium hydroxide were added to 30 cc. of water and the solution added to the acidic material. Upon each addition, the material became very viscous and two liters of a 5% butyl alcohol solution in lactol spirits were added. The mixture was stirred for two hours at 80–90° C. and water was removed by means of a water trap under reflux conditions. The product was then filtered and the solvent removed at 165° C. at a pressure of 2 mm. Hg. The residue was a dark brown lumpy solid having no odor. Upon analysis this product was found to contain 7.6% sulphur, had an acid number of 6.53 and a calcium sulphate ash of 10.3%. This material was found to be insoluble in oils.

This product may be conveniently used as an intermediate in the preparation of heavier metal salts by the well-known process of double decomposition.

*Example 18*

The disulphide of wax-substituted diphenyl oxide sulphonic acid was prepared in the same manner as outlined above in Examples 16 and 17 using 88 grams of wax-substituted diphenyl oxide, 20.3 grams of chlorosulphonic acid, and 11.3 grams of $S_2Cl_2$; with the exception that 38 grams of a 70-5 vis. oil were added prior to the $S_2Cl_2$ treatment step. Following the conversion to the disulphide, 148 grams of the same oil were added to the mixture together with 20 cc. of methyl alcohol and 22.2 grams of barium carbonate (.25% excess). This mixture was heated at 70° C. until it became thick, at which time two liters of benzene were added. The solution was stirred for three hours at 70–80° C. The solvent was evaporated at 160° C. at 55 mm. pressure. 40 grams of capryl alcohol were added and additional solvent to facilitate filtration. Filtration was found to be very difficult. The solvent was removed to a temperature of 120° C. at a pressure of 50 mm. Hg. The resultant product was a jell-like solid having a dark brown color and no odor. It was soluble in neutral oil at concentration of 50%, 10%, and 1% and showed no tendency to settle out upon standing for a period of one month. This product analyzed 2.5% sulphur, had an acid number of 3.88, and a calcium sulphate ash of 3.85%.

*Example 19*

186.5 grams (1.60 m.) (a 5% excess) chlorsulphonic acid were combined with 800 grams (1.525 m.) of wax-substituted diphenyl oxide in a reaction flask at 30–50° C. and then stirred for one hour at 50–60° C. The acid number of the resulting product was found to be 107.5. The material was then heated an additional 30 minutes at 150–160° C. at which time 620 grams (1.525 m.) of capryl naphthalene were added to the reaction mass and the mass split into two separate batches. 97.7 grams (.724 m.) of $S_2Cl_2$ were added to 770 grams of the above reaction mass and stirred for 1½ hours at 60–70° C. The acid number of the material was 57.2. 550 grams of SSU 160 oil, 36 grams of 25% excess of lime, 100 cc. of water, 50 cc. of methanol and 100 cc. of benzene were then added to the reaction product and refluxed for two hours at 70 to 90° C. to form the calcium salt. The resulting mixture was dried by heating to 140–150° C. The mixture was very thick, therefore, 1200 cc. of benzene were added and the solution filtered with 50 grams of "Hyflo" and 200 cc. of isopropyl alcohol. The solvents were distilled off at 110–160° C. and at 28 inches vacuum. The yield of capryl naphthalene, calcium salt of wax-substituted diphenyl oxide sulphonic acid disulphide was 88%. The product had a slight odor and was a dark brown jell-like solid which was soluble up to 50% in Pennsylvania 150 neutral oil. The product analyzed as containing 4.54% sulphur and 3.0% sulphate.

*Example 20*

1% of powdered copper by weight was added to 770 grams of the product mentioned in Example 19, i. e. the other ½ batch, and heated to 60° C. 97.7 grams of $S_2Cl_2$ were then added and stirred for 1½ hours at 60–70° C. The acid number of the material was 57.2. 550 grams of SSU-169 oil, 41 grams of 25% excess lime, 100 cc. water, 50 cc. of methanol and 100 cc. of benzene were added and the mixture refluxed for 2 hours at 70–90° C. to form the calcium salt. The mixture was almost solid so 1100 cc. benzene were added and the solution filtered with 50 grams of "Hyflo" and 200 cc.'s of isopropyl alcohol. The solvents were distilled off at 150–160° C. and 27 inches vacuum. The yield of the capryl napthalene, wax-substituted diphenyl oxide sulphonic acid sulphide was 95%. The product was 50% soluble in Pennsylvania 150 neutral oil, when 10% of capryl alcohol was used as an initial solubilizer. The product analyzed as containing 4.07% sulphur, 3% sulphate ash, and the acid number was 0.

In several of the previous examples will be observed that I have employed both high molecular weight alcohols and low molecular weight alcohols in conjunction with the salt formation step. The low molecular weight alcohols, i. e. ethyl, methyl, propyl, and butyl alcohols have been found to facilitate the formation of the heavier metal salts of the acidic reaction products. It will also be observed that some of the products have been produced as oil solutions, and in certain instances, it becomes convenient to include a small amount of a higher molecular weight alcohol such as capryl alcohol to serve as a solubilizer for the salt produced.

Note should be made of the following alterations in the procedural steps which may be followed without substantially altering the nature of the final product. For example, instead of first producing the sulphonic acid derivative of the wax-substituted diphenyl oxide, it is usually possible to produce the sulphide or polysulphide of the wax-substituted diphenyl oxide and subsequent thereto, treat such material to convert it to the sulphonic acid.

The salts of the foregoing compounds are secured by ordinary processes of neutralization of the sulphonic acid groups with a basic material. When a metal salt is desired, the oxides, hydroxides, and carbonates of the alkali metals, such as, sodium, potassium, and lithium; the alkaline earth metals, such as, barium, calcium, magnesium, strontium; polyvalent metals, such as, silver, copper, aluminum, lead, iron, arsenic, antimony, manganese, bismuth, nickel, etc., may be conveniently employed. The neutralization may be accomplished either by direct neutralization or by double decomposition from the alkali metal salt. Organic salts may be formed by treating the sulphonic acid derivatives with organic amines such as, triethanolamine, diethanolamine, aniline, cyclohexylamine, etc.

The salt of the sulphonic acid should be made after the sulphide linkage forming step. Other and obvious variations in the production of these compounds may be made without departing from the molecular structure set forth herein.

The procedure for preparing these compounds as disclosed herein has been found to be the most convenient from the standpoints of ease of preparation and the obtaining of maximum yields for each step in the procedure.

As indicated above, the product of this invention can be made in several ways either with respect to the alkylation procedure followed, or with respect to the sulphonation procedure followed.

Other modes of applying the principle of the invention may be employed, change being made as regards the details described, provided the features stated in any of the following claims, or the equivalent of such, be employed.

I therefore particularly point out and distinctly claim as my invention:

1. As new chemical compounds, paraffin wax substituted diphenyl oxide sulphide which contain the —$SO_3X$ group wherein X is selected from the class of hydrogen and one equivalent of a salt forming radical.

2. As new chemical compounds, the metal salts of paraffin wax substituted diphenyl oxide sulphonic acid sulphide.

3. As a new chemical compound, the sodium salt of paraffin wax substituted diphenyl oxide sulphonic acid disulphide.

4. As a new chemical compound, the calcium salt of paraffin wax substituted diphenyl oxide sulphonic acid disulphide.

5. As new chemical compounds, the barium salt of paraffin wax substituted diphenyl oxide sulphonic acid sulphide.

CARL F. PRUTTON.

REFERENCES CITED

The following references are of record in the file of this patent:

UNITED STATES PATENTS

| Number | Name | Date |
|---|---|---|
| 1,758,277 | Daimler | May 13, 1930 |
| 2,081,876 | Prahl | May 25, 1937 |
| 2,242,260 | Prutton | May 20, 1941 |
| 2,244,512 | Brandt | June 3, 1941 |
| 2,245,643 | Borglin | June 17, 1941 |
| 2,418,894 | McNab et al. | Apr. 15, 1947 |
| 2,465,902 | McNab | Mar. 29, 1949 |